United States Patent
Lyle

(10) Patent No.: US 9,361,307 B2
(45) Date of Patent: Jun. 7, 2016

(54) REJECTING ROWS WHEN SCANNING A COLLISION CHAIN THAT IS ASSOCIATED WITH A PAGE FILTER

(71) Applicant: International Business Machines Corporation, Armonk, NY (US)

(72) Inventor: Robert W. Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/533,929

(22) Filed: Nov. 5, 2014

(65) Prior Publication Data

US 2015/0058356 A1 Feb. 26, 2015

Related U.S. Application Data

(63) Continuation of application No. 13/248,800, filed on Sep. 29, 2011, now Pat. No. 8,903,831.

(51) Int. Cl.
*G06F 17/30* (2006.01)

(52) U.S. Cl.
CPC ...... *G06F 17/30097* (2013.01); *G06F 17/3033* (2013.01); *G06F 17/30386* (2013.01); *G06F 17/30483* (2013.01)

(58) Field of Classification Search
CPC ................................................ G06F 17/30097
See application file for complete search history.

(56) References Cited

U.S. PATENT DOCUMENTS

| | | | |
|---|---|---|---|
| 5,140,321 A | 8/1992 | Jung | |
| 5,687,361 A | 11/1997 | Sarkar | |
| 6,292,795 B1 | 9/2001 | Peters et al. | |
| 6,516,320 B1 | 2/2003 | Odom et al. | |
| 2001/0047360 A1 | 11/2001 | Huras et al. | |
| 2006/0212465 A1 | 9/2006 | Fish et al. | |
| 2006/0282457 A1 | 12/2006 | Williams | |
| 2008/0059412 A1 | 3/2008 | Tarin | |
| 2009/0031044 A1 | 1/2009 | Barrack et al. | |
| 2009/0037500 A1 | 2/2009 | Kirshenbaum | |
| 2010/0191884 A1 | 7/2010 | Holenstein et al. | |
| 2010/0257181 A1 | 10/2010 | Zhou et al. | |
| 2011/0113048 A1 | 5/2011 | Njemanze | |
| 2011/0145188 A1 | 6/2011 | Vachuska | |
| 2011/0153861 A1 | 6/2011 | Chauhan | |
| 2013/0086073 A1 | 4/2013 | Lyle | |

OTHER PUBLICATIONS

Final Office Action 1, Jan. 3, 2013, for U.S. Appl. No. 13/248,800, filed Sep. 29, 2011 by R.W. Lyle, Total 20 pp. [57.250 (FOA1)].

Notice of Allowance 1, Jul. 23, 2014, for U.S. Appl. No. 13/248,800, filed Sep. 29, 2011 by R.W. Lyle, Total 14 pp. [57.250 (NOA1)].

Office Action 1, Jul. 12, 2012, for U.S. Appl. No. 13/248,800, filed Sep. 29, 2011 by R.W. Lyle, Total 30 pp. [57.250 (OA1)].

Response to Office Action 1, Oct. 12, 2012, for U.S. Appl. No. 13/248,800, filed Sep. 29, 2011 by R. W. Lyle, Total 20 pp. [57.250 (ROA1)].

Response to Final Office Action 1, Apr. 2, 2013, for U.S. Appl. No. 13/248,800, filed Sep. 29, 2011 by R. W. Lyle, Total 14 pp. [57.250 (RFOA1)].

*Primary Examiner* — Apu Mofiz
*Assistant Examiner* — Dara J Glasser
(74) *Attorney, Agent, or Firm* — Janaki K. Davda; Konrad, Raynes, Davda & Victor LLP

(57) ABSTRACT

Provided are techniques for locating a row. A page filter in a page is stored, wherein the page filter is associated with a collision chain and includes a portion of a hash value of the row in the collision chain that has overflowed to an overflow area. In response to a request to locate a target row, the page filter is used to determine that the row has overflowed based on a portion of a hash value of the target row matching the portion of the hash value of the row that has overflowed.

15 Claims, 11 Drawing Sheets

REJECTING ROWS WHEN SCANNING A COLLISION CHAIN THAT IS ASSOCIATED WITH A PAGE FILTER

BACKGROUND

Embodiments of the invention relate to rejecting rows when scanning a collision chain.

In a hashed table organization, one key (formed by one or more columns of a database table) is typically defined as a hash key, and this hash key is used to quickly locate rows that have equal hash key values.

For example, the hash key is like an index key, and the hash key can be a single column (e.g. account number) or multiple columns (e.g. last name, first name, middle name). The hash key has an associated hash key value, and, from the hash key value, a hash value is computed, which may appear to be random number (e.g. an 8 byte integer). A hash function is used to map any particular hash key value to a hash value.

Once a hash value is known, the hash value modulo "a number of pages" is used to determine a page number (target page) from a set of pages in a database. Prime numbers may be used to reduce collisions. Typically, a hash function (e.g., an algorithm) is applied to the bytes of the hash key to generate a quasi-random numeric hash value. The hash value is then used to identify a page that a particular hash key value is located on. Typically the page is identified by using modulo arithmetic (i.e., dividing the hash value by the number of pages, and then using the remainder as the page number, which can be written as "hash_value mod n", where n is the number of pages to hash into). Implementations often also hash to a particular row, or collision chain of rows, within the page using the same approach. Often, there is a group of rows that need to be verified to determine whether each of the rows matches the hash key value (i.e., matches the one or more column values forming the hash key).

Once the hash page is identified, the hash value modulo a "number of collision chains or number of rows" is used to determine where the row goes (i.e. a target collision chain or a target row).

Thus, with a hashed table, given a hash key, a hash value is determined and used to identify the page and location within the page of one or more rows with that particular hash key value. The following illustrates the use of the hash key to obtain a hash value, which is used to identify a page and a collision chain on the page.

Hash Key->Hash Value->(page, collision chain)

It is possible for a lot of different hash keys to produce the same hash value, and it is possible for different hash values to result in the same page number and/or collision chain. For this reason, any given hash collision chain can contain rows with many different hash key values as well as hash values.

In particular, once on a target page, different hash keys may map to the same row or collision chain, and this may be described as a hash collision. Once at the collision chain, the row that truly matches the hash key value is identified. In such cases, the hash value modulo the number of collision chains in the page may be used to identify a particular collision chain in the page. The number of collision chains in a page can vary from one (in which case every row on the page is considered a hash collision) to many.

That is, many hash key values can result in the same hash value, and many different hash values can 'map' to the same page and the same collision chain. For example, if there are 16 data pages, hash values of 1 and 17 would both map to the same page, and, if there were 8 collision chains in a page, hash values of 1 and 17 would also end up on the same page. Prime numbers for the number of pages/collision chains may be used to help reduce the number of collisions. Such use of a hash key and a hash value behaves somewhat randomly. For example, if there are 1 million hash pages, there is about a 1 in a million chance that any two rows will be on the same page, and, if there are 30 collision chains within that page, there is about a 1/30 chance that any two rows on a particular page will be on the same collision chain. While looking for a row, if one is found on a collision chain, it is possible that it is the row to be located or that it is a different hash key that just happened to end up on the same collision chain.

Once at the collision chain level, the collision chain is scanned to find all occurrences of the particular hash key value to be located. This is typically done by comparing the actual columns of the hash key (i.e. comparing the account number or last/first name columns of the hash key) to the same columns of the row in the collision chain. Note that comparing the hash value alone is not sufficient because multiple hash keys can result in the same hash value. If the hash key is known to be unique, processing is done until a matching hash key is found (and only half the collision chain is scanned on average if the matching hash key is on the collision chain, and, because the hash key is unique, processing is done once the match is found). If the hash key is unique, but the particular hash key to be located does not exist, the entire collision chain is scanned to determine that the hash key does not exist. If the hash key is not unique, then the whole collision chain is scanned to find all matches.

When trying to locate a row with a particular hash key value, the hash value is computed from the hash key (i.e., from the one or more columns making up the hash key), and then the target page and collision chain are computed arithmetically using modulo or other arithmetic means. Once the collision chain is accessed, the collision chain is typically scanned to identify one or more rows on the collision chain that match the desired hash key value. When collision chains are very short (e.g., zero or one entries on the collision chain), scanning the rows on the collision chain is very fast and uses little Central Processing Unit (CPU) processing. However, as collision chains get longer, the amount of the CPU processing used to identify which rows match a particular hash key becomes more expensive.

Also, in some cases, rows are compressed in the page. In this case, the row is first decompressed to determine whether the hash key of that row matches the target hash key. In the event that a query is looking for a row that does not exist, it is necessary to scan all entries on the collision chain just to determine that the row does not exist. Thus, CPU processing is used to find the correct row on the collision chain.

SUMMARY

Provided are a method, computer program product, and system for rejecting rows while locating a target row. For a row that is stored in a hash space, a row filter value is generated for that row, and the row filter value is stored with the row. While trying to locate the target row in a collision chain in the hash space, a row filter value is calculated for the target row. For the row in the collision chain, the stored row filter value of the row in the collision chain is compared with the computed row filter value of the target row. In response to determining that the stored row filter value does not match the computed row filter value, it is determined that the row in the collision chain is not the target row.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
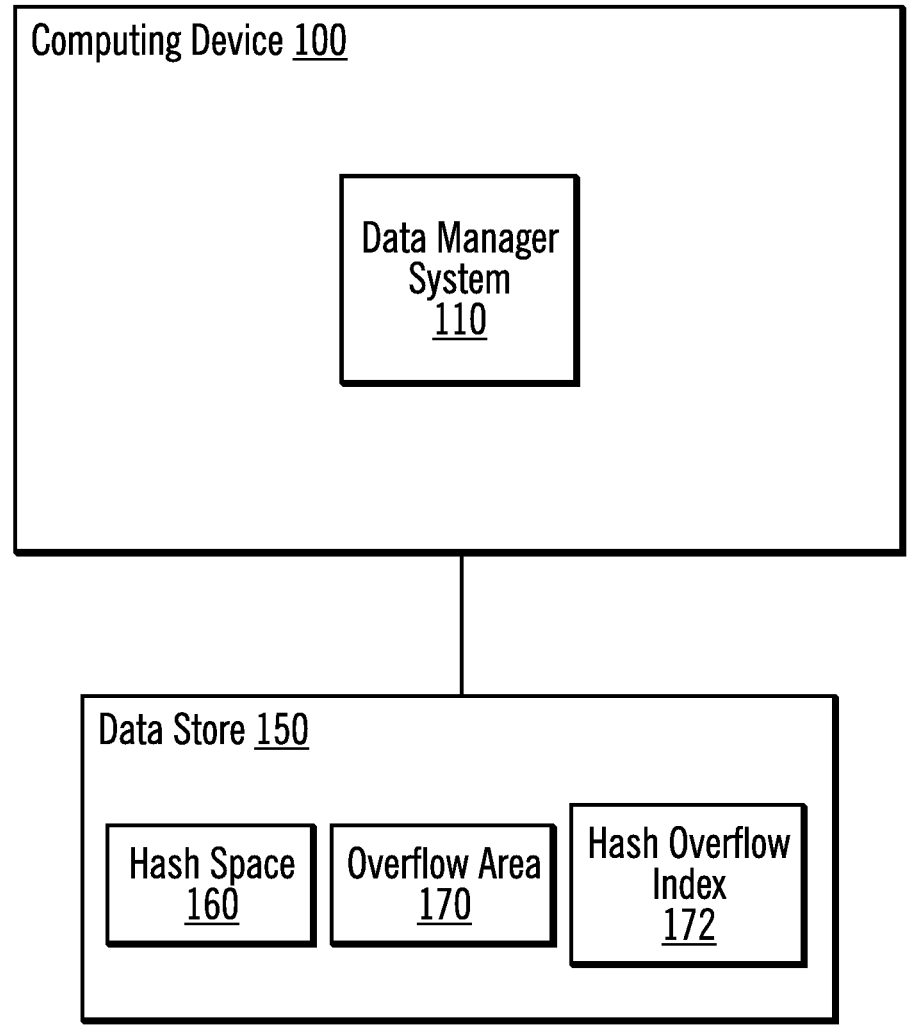
FIG. 1 illustrates, in a block diagram, a computing architecture used in accordance with certain embodiments.

FIG. 1 illustrates, in a block diagram, a computing architecture used in accordance with certain embodiments. In FIG. 1, a computing device 100 includes a data manager system 110. The computing device 100 is coupled to a data store 150. In certain embodiments, the computing device 100 is a server computer, the data manager system 110 is part of a database program, and the data store 150 is a database.

The data store 150 includes a hash space 160, an overflow area 170, and a hash overflow index 172. The hash space 160 may be described as a set of pages that are hashed into to store rows. The overflow area 170 stores rows of data that do not fit on the target page identified for those rows (e.g., the rows do not fit on the page identified using the "hash value mod n" technique). The overflowed rows are indexed in the hash overflow index 172. Although an overflow area 170 is described herein, in alternative embodiments, other approaches (e.g., chains of collisions in other pages) may be used.

The data manager system 110 stores additional information with each row. By doing this, the data manager system 110 reduces the amount of CPU processing needed to find the correct row on a collision chain. In particular, the data manager system 110 introduces a row filter that is stored with the row. Using this row filter, the data manager system eliminates rows when searching for a particular hash key value on a collision chain. In addition, the data manager system 110 stores a page filter for rows in the overflow area 170.

Figure 2:
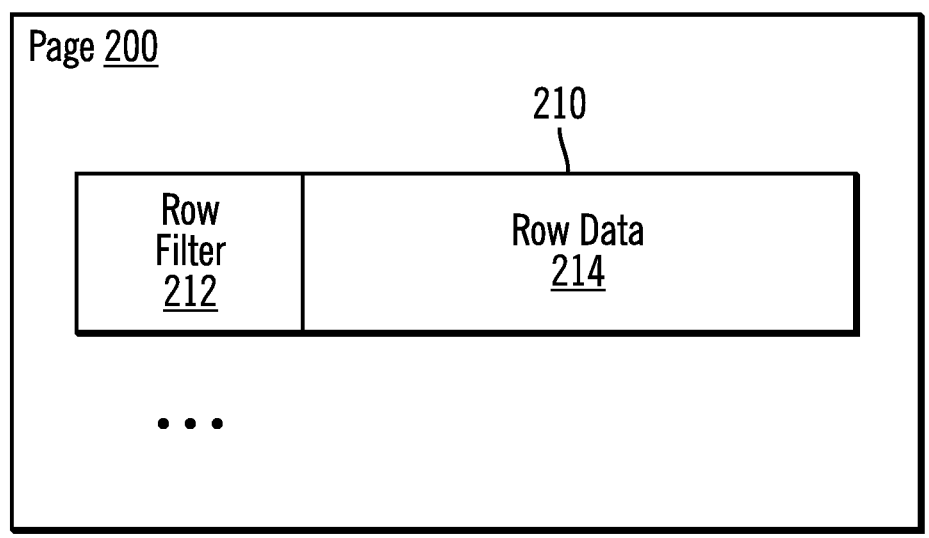
FIG. 2 illustrates, in a block diagram, a row filter of a row in accordance with certain embodiments.

FIG. 2 illustrates, in a block diagram, a row filter of a row in accordance with certain embodiments. In FIG. 2, a page 200 includes a row 210, while the ellipses indicate that other rows may be stored on the page 200. Row 210 includes a row filter 212 and row data 214. Although the row filter 212 is illustrated before the row data 214, the row filter may be located after the row data 214 or within the row data 214. In certain embodiments, the row 210 has fields, and the filter 212 is an additional field in the row.

The row filter 212 has an associated row filter value. In certain embodiments, the row filter value is comprised of one to many bits. In certain embodiments, the row filter value is comprised of some portion of the hash value (i.e., a subset of the bits generated by applying the hash function to the hash key). In certain alternative embodiments, the data manager system 110 performs arithmetic calculations on the hash value to determine the row filter value. In yet other embodiments, the data manager system 110 stores the entire hash key value as the row filter value. In certain embodiments, the data store manager 110 stores 4 bits of the hash value with each row. In certain alternative embodiments, the data store manager 110 stores an extra byte with each row that contains eight bits from the hash function.

Figure 3:
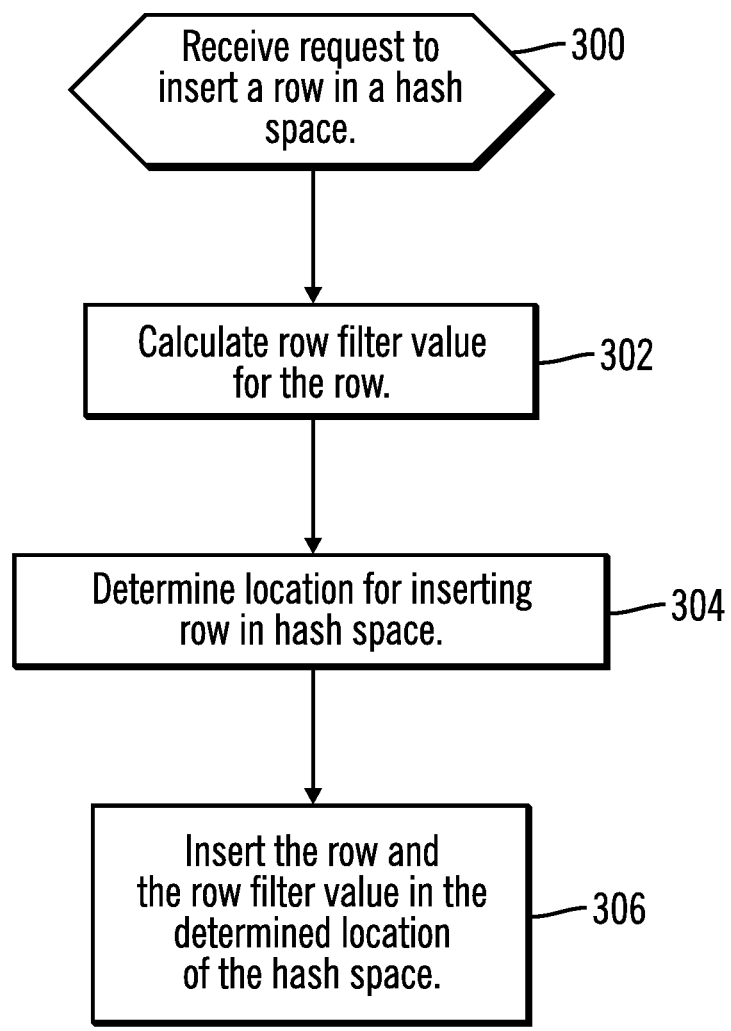
FIG. 3 illustrates, in a flow diagram, logic for storing a row with a row filter in accordance with certain embodiments.

FIG. 3 illustrates, in a flow diagram, logic for storing a row with a row filter value in accordance with certain embodiments. Control begins at block 300 with the data manager system 110 receiving a request to insert a row into the hash space 160. In block 302, the data manager system 110 calculates the row filter value. In block 304, the 306, the data manager system 110 determines the location for inserting the row into the hash space 160. In block 306, the data system manager 110 inserts the row and the row filter value in the determined location of the hash space 160.

Thus, with embodiments, the insertion into the hash space 160 is changed so that, in addition to storing the row, the data manager system 110 also stores the row filter value. In particular, when inserting a row into a collision chain, the data manager system 110 stores a row filter value into the filter field of the row.

Figure 4A:
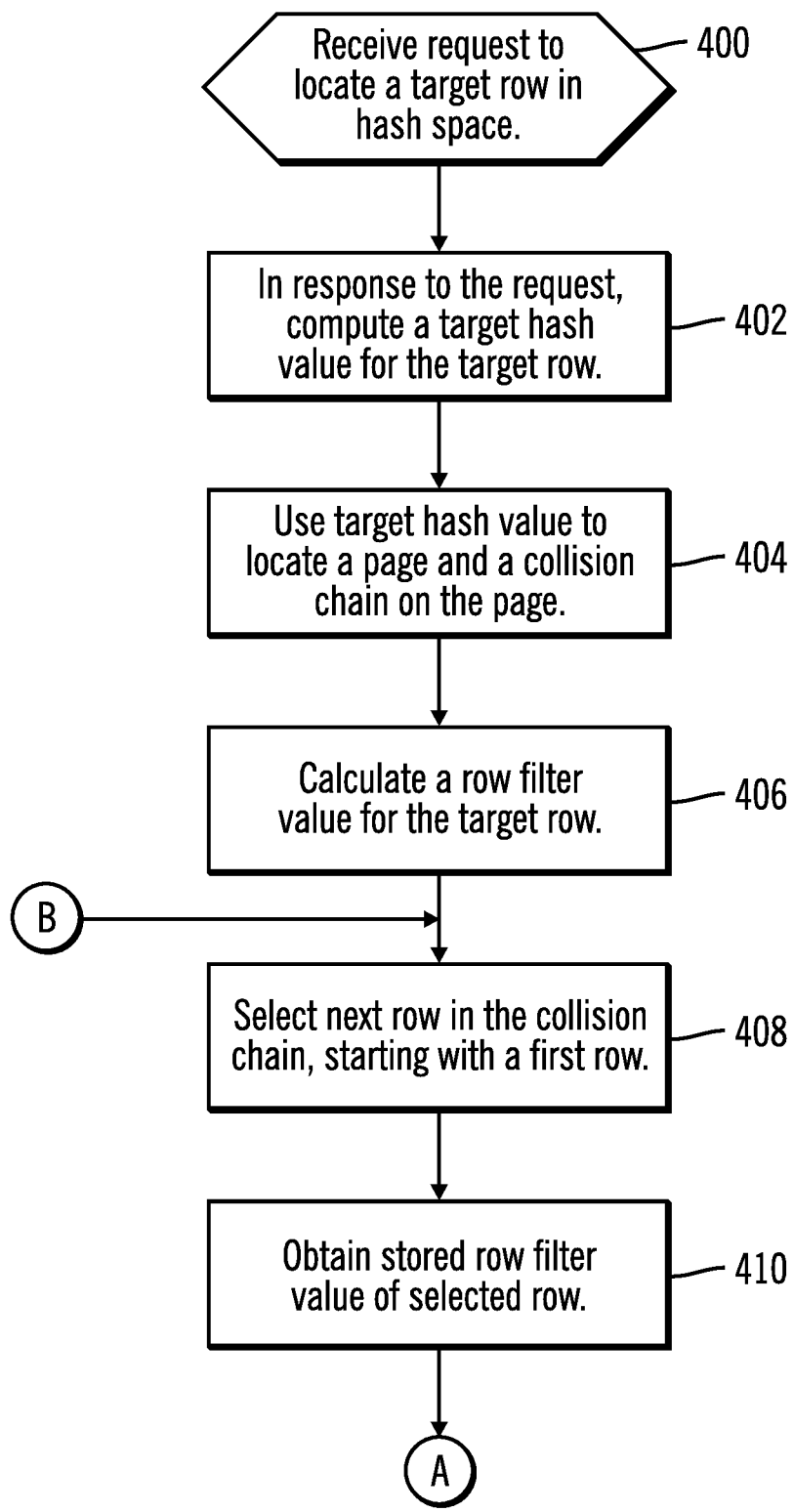
FIGS. 4A and 4B illustrate, in a flow diagram, logic for locating a target row using row filter values in accordance with certain embodiments.
Figure 4B:
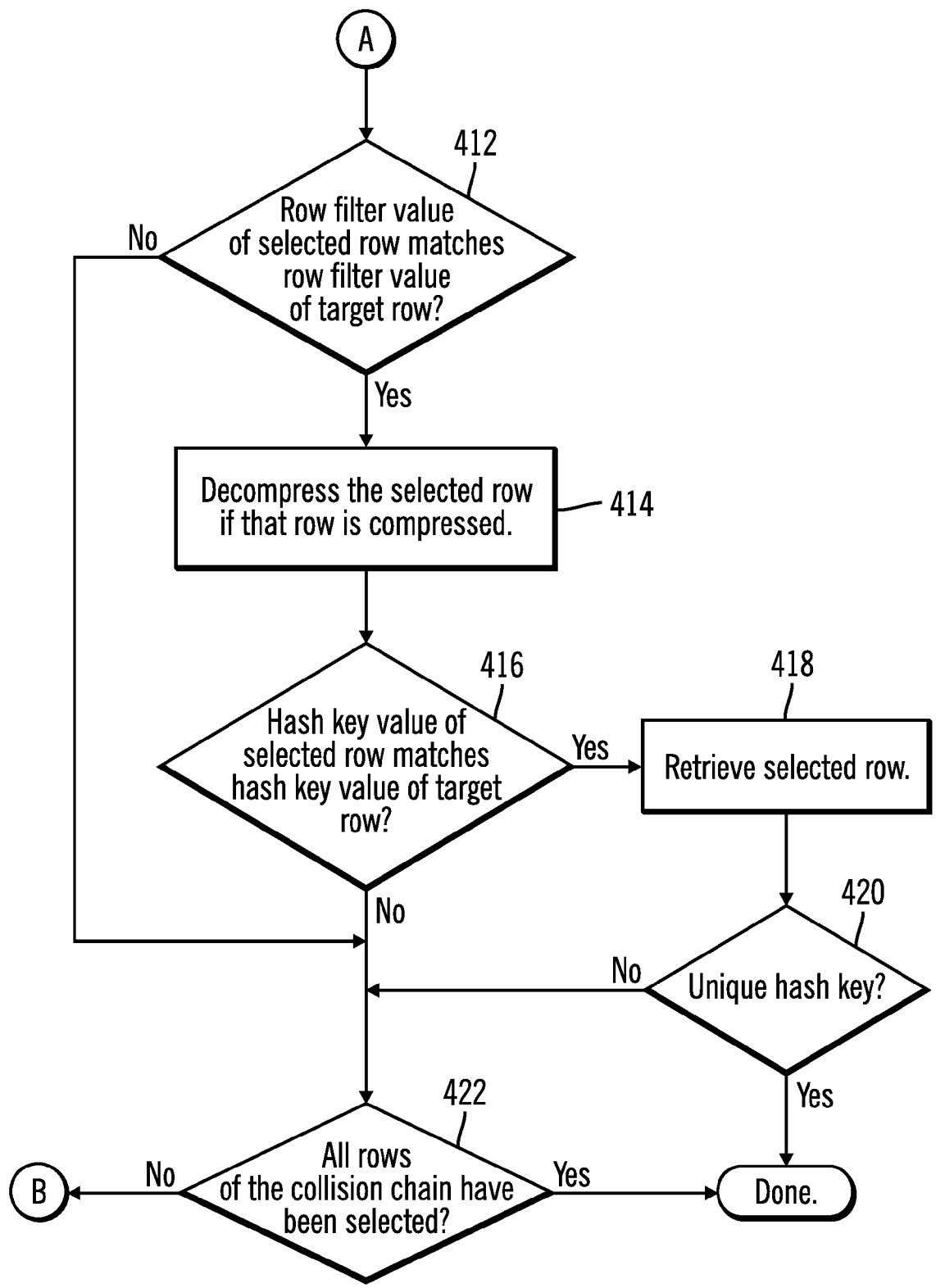

FIGS. 4A and 4B illustrate, in a flow diagram, logic for locating a target row using row filter values in accordance with certain embodiments. Control begins at block 400 with the data manager system 110 receiving a request to locate a target row in the hash space 160. The data manager system 110 may be locating the target row when performing a reading transaction to locate a row to be retrieved or performing an insertion while enforcing uniqueness in the hash space 160. In block 402, in response to the request, the data manager system 110 computes a target hash value for the target row to be located or inserted. In block 404, data manager system 110 uses the target hash value to locate a page and a collision chain on the page. In certain embodiments, the data manager system 110 uses modulo arithmetic to find the page and the collision chain within the page. In block 406, the data system manager 110 calculates a row filter value for the target row to be located or inserted. From block 406 (FIG. 4A), processing continues to block 408 (FIG. 4B).

In block 408, the data system manager 110 selects the next row in the collision chain, starting with the first row. In block 410, the data system manager 110 obtains a stored row filter value of the selected row. This is the row filter value stored with the selected row. In block 412, the data system manager 110 determines whether the row filter value of the selected row matches the row filter value of the target row. If so, processing continues to block 414, otherwise, processing continues to block 422. That is, if there is no match, then the selected row is rejected as a match.

In block 414, the data system manager 110 decompresses the selected row if the selected row is compressed. In block 416, the data system manager 110 determines whether the hash key value of the selected row matches the hash key value of the target row. If so, processing continues to block 418, otherwise, processing continues to block 422.

In block 418, the data system manager 110 retrieves the selected row. In block 420, the data system manager 110 determines whether the hash key is unique. If so, processing is done, otherwise, processing continues to block 422.

In block 422, the data system manager 110 determines whether all rows of the collision chain have been selected. If so, processing is done, otherwise, processing continues to block 408 (FIG. 4A) to select another row in the collision chain.

Thus, when the data system manager 110 looks for a hash key value on a particular hash collision chain, before doing any decompression or key comparison, the data system manager 110 compares the row filter value for the selected row against the row filter value for the target row.

For example, if the row filter value is eight bits of the hash value, the data system manager 110 compares the same eight bits of the hash value for the selected row and the target row. If the eight bit row filter value does not match, then the selected row does not contain the target hash value (because equal hash key values hash to the same hash value when using the same hash function), and, thus, there is no need to lock the selected row, decompress the selected row, and/or compare the hash key value of the selected row with the hash key value of the target row. With an eight bit row filter value, if a good hash function is used, then it is estimated that the data system manager 110 will further interrogate a row that is not the target row that is being searched for 1/256 times. In various embodiments, by storing more bits (or all the bits) of the hash value, the odds of interrogating the wrong row may be further reduced (i.e., for a row filter value of 32 bits, the odds are around ¼ billion). Alternately, the entire hash key may be stored (decompressed) at the front of the row to ensure a quick comparison is all that is needed to identify the target row. By using the smaller row filter values (e.g., four bits), it is possible to get reductions in CPU use for a very small amount of space in the row.

Figure 5:
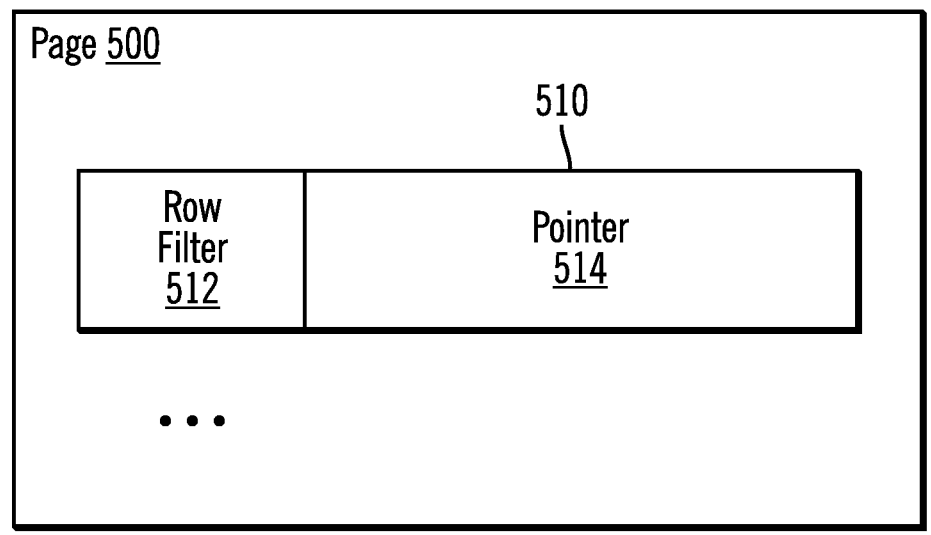
FIG. 5 illustrates, in a block diagram, a row filter in a pointer subrecord in accordance with certain embodiments.

FIG. 5 illustrates, in a block diagram, a row filter in a pointer subrecord in accordance with certain embodiments. In FIG. 5, a page 500 includes a pointer subrecord 510, while the ellipses indicate that other rows or other pointer subrecords may be stored on the page 500. The pointer subrecord 510 includes a row filter 512 and a pointer 514. Although the row filter 512 is illustrated before the pointer 514, the row filter may be located after the pointer 514. The pointer 514 stores a location of a page storing the row data associated with the pointer subrecord 510. The row filter 512 has an associated row filter value.

That is, in the case in which pointer subrecords are present (i.e., when rows get updated so that the rows have to be moved off of a target page), the row filter value is stored with a pointer subrecord. In this case, the embodiments avoid looking at rows on other pages when the row filter value of the target row does not match the row filter value of the pointer subrecord. This leads to savings in CPU usage and Input/Output (I/O) reductions.

In certain embodiments, when rows do not fit on their target page (e.g., the page identified using the "hash$_{13}$ value mod n" technique), the rows are placed in the overflow area 170, beyond the contiguous hash space 160. When this happens, the overflowed rows are indexed in the hash overflow index 172. In certain embodiments, the hash overflow index 172 is sparse and contains entries for those rows that did not fit in their target pages. When a row does not fit into a page, the collision chain that the hash overflow row would have belonged on is marked as having overflowed. When this happens, the data manager system 110 interrogates the hash overflow index 172 to see whether the hash key value exists in the overflow area 170. Typically, the percentage of overflows in a hash space is low (e.g., maybe 5%), but as the percentage of overflows grows, the number of times this hash overflow index 172 is interrogated increases.

Figure 6:
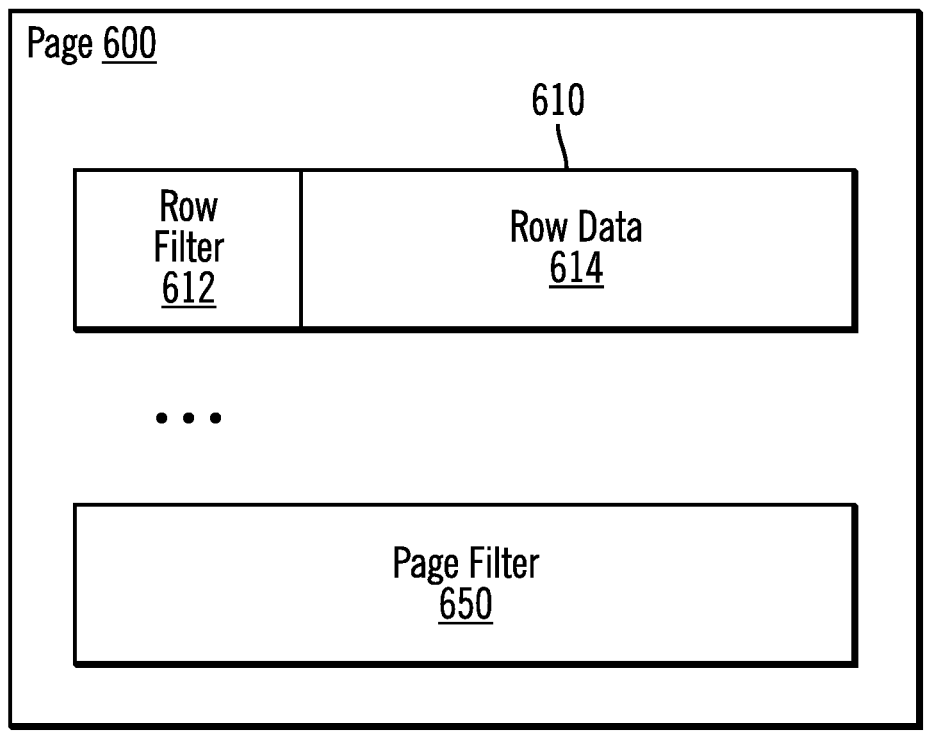
FIG. 6 illustrates, in a block diagram, a page filter in accordance with certain embodiments.

FIG. 6 illustrates, in a block diagram, a page filter in accordance with certain embodiments. In FIG. 6, a page 600 includes a row 610, while the ellipses indicate that other rows may be stored on the page 600. Row 610 includes a row filter 612 and row data 614. Although the row filter 612 is illustrated before the row data 614, the row filter may be located after the row data 614 or within the row data 614. In certain embodiments, the row 610 has fields, and the filter 612 is an additional field in the row. The row filter 612 has an associated row filter value. In addition, the page 600 includes a page filter 650. That is, in certain embodiments, the data manager system 110 reserves some space in the page 600 to contain the page filter for rows that should have been stored on this page 600, but that are actually stored in the overflow area 170. In certain embodiments, the page filter is a list of n-bit entries or, alternatively, a series of indicators (e.g., bits) that are set based upon the hash values of the rows that have overflowed from this page 600. In certain embodiments, there is a different page filter 650 for each collision chain.

For example, assume that the page filter has 64 bits. If one row has overflowed, the entire hash value of the row may be stored in the page filter. If two rows have overflowed, 4 bytes of each hash value of each row may be stored in the page filter. Similarly, for up to 8 rows overflowed, a single byte of the hash value may be stored in the page filter. If more than 8 rows have overflowed, the page filter may be used as an array of 64 bits, and 6 bits of the hash value may be used to "turn on" a single bit of the array. In this way, the page filter dynamically adjusts to store portions of the hash value as the number of overflowed rows increases. Thus, the page filter may store a list of partial or entire hash values, with the size of the entries changing dynamically as more overflows occur.

In certain embodiments, the page filter is an array of 64 bits, and the hash value is used to turn on one bit when a row overflows. Thus, if 10 rows had overflowed, then 10 bits of the page array are turned on (or fewer if two rows hashed to the same bit). Then, the data manager system 110 looks for an overflowed row if the bit associated with the hash value of that row is set in the array.

Thus, the page filter may take different forms (e.g., having entries storing partial or full hash values or as an indicator array indicating which partial hash values have overflowed). In each of the different forms, the page filter stores information about which hash values have overflowed and which have not.

For ease of reference, the information stored in the page filter is referred to herein as an overflow filter. For a page filter that may be described as having entries, each of the entries may store an overflow filter, which may be either the entire hash value or a portion of the hash value for each row that has overflowed. For a page filter that may be described as an array of n-indicators that may be turned on, each indicator (e.g., bit) may be described as an overflow filter. In such an embodiment, the each indicator in the array is associated with a particular hash value. When the indicator is set to on, the indicator indicates that a row having the particular hash value has overflowed to the overflow area 170.

Figure 7:
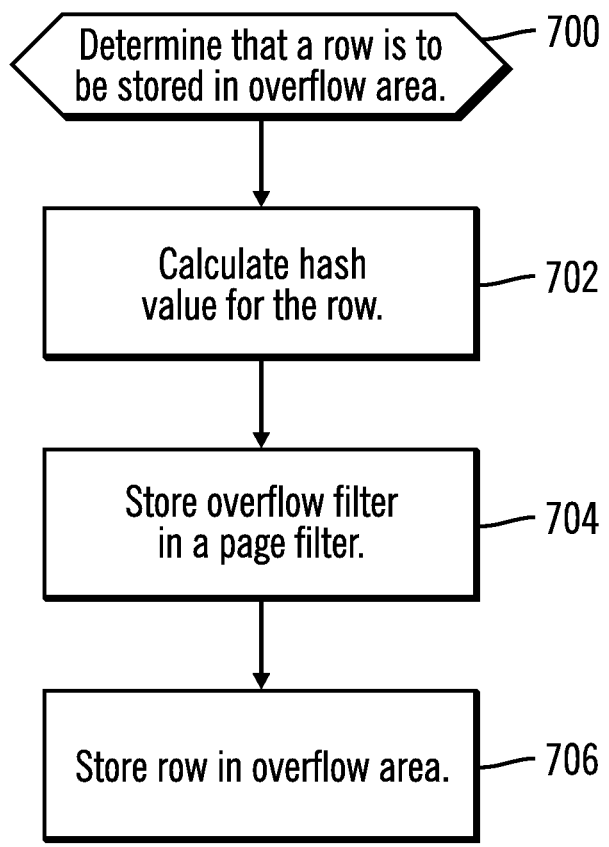
FIG. 7 illustrates, in a flow diagram, logic for storing a page filter in accordance with certain embodiments.

FIG. 7 illustrates, in a flow diagram, logic for storing a page filter in accordance with certain embodiments. Control begins at block 700 with the data manager system 110 determining that a row is to be stored in the overflow area 170.

In block 702, the data manager system 110 calculates a hash value for the row. In block 704, the data manager system 110 stores an overflow filter for the row in a page filter. In certain embodiments, the overflow filter is either the entire hash value or a portion of the hash value, and whether the entire hash value or a portion of the hash value is to be stored is determined dynamically. In certain alternative embodiments, the overflow filter is an indicator in an array that is set to indicate that a row associated with the hash value has overflowed. In block 706, the data manager system 110 stores the row in the overflow area 170.

Figure 8A:
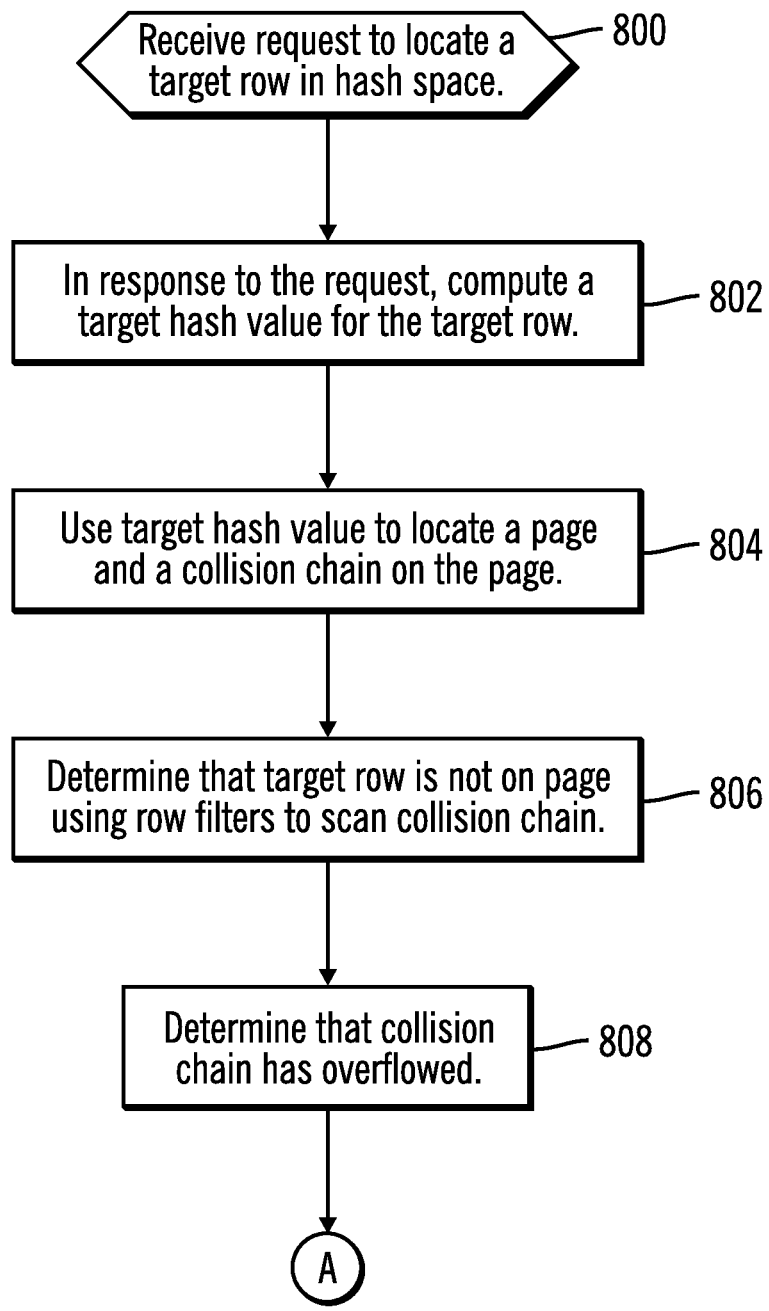
FIGS. 8A and 8B illustrate, in a flow diagram, logic for using a page filter in accordance with certain embodiments.
Figure 8B:
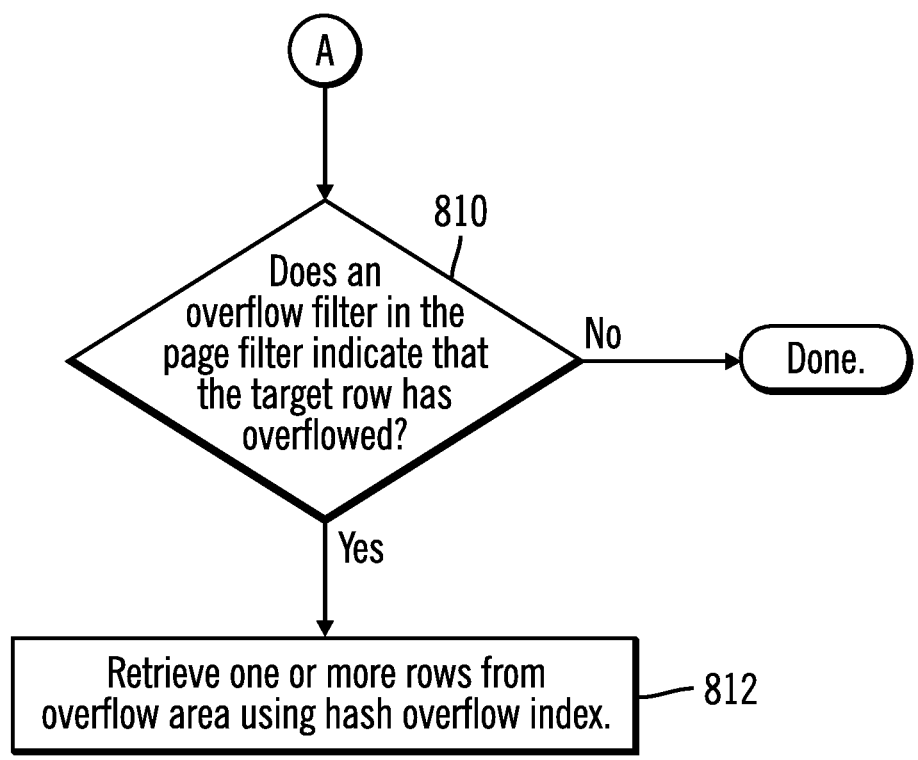

FIGS. 8A and 8B illustrate, in a flow diagram, logic for using a page filter in accordance with certain embodiments. Control begins at block 800 with the data manager system 110 receiving a request to locate a target row in the hash space 160. The data manager system 110 may be locating the target row when performing a reading transaction to locate a row to be retrieved or performing an insertion while enforcing uniqueness in the hash space 160. In block 802, in response to the request, the data manager system 110 computes a target hash value for the target row to be located or inserted. In block 804, data manager system 110 uses the target hash value to locate a page and a collision chain on the page. In certain embodiments, the data manager system 110 uses modulo arithmetic to find the page and the collision chain within the page. In block 806, the data manager system 110 determines that the target row is not on the page using row filters to scan the collision chain. In block 808, the data manager system 110 determines that the collision chain has overflowed. In certain embodiments, the collision chain is marked to indicate that it has overflowed. From block 808 (FIG. 8A), processing continues to block 810 (FIG. 8B).

In block 810, the data manager system 110 whether an overflow filter in the page filter indicate that the target row has overflowed. In certain embodiments, this determination is made by looking for a portion of the hash value or the entire hash value of the target row in the page filter. In certain other embodiments, this determination is made by checking whether an indicator (e.g., a bit) associated with the hash value of the target row is set to on. If so, processing continues to block 812, otherwise, processing is done. In block 812, the data manager system 110 retrieves one or more rows from the overflow area 170 using the hash overflow index 172, where the retrieved rows have hash key values matching the target hash key value of the target row. For example, if the hash key is known to be unique, one row may be retrieved, otherwise, more than one row may be retrieved.

Thus, when a reading transaction tries to find a particular hash key value and discovers that the target hash collision chain has overflowed, then the page filter on the page or collision chain is used to reduce the chances of having to interrogate the hash overflow index 172. For example, if the data manager system 110 stored some number of one byte entries in the page filter to indicate a subset of the hash value bits for the rows that have overflowed (e.g., as row filters for those overflowed rows), then, before checking the hash overflow index 172, the data manager system 110 checks whether any of the overflowed entries had a row filter value that matched the subset of hash value bits of the target row. As an example, if the row filter is eight bits of the hash value, then, the eight bits of each entry of the page filter may be compared to the eight bits of the target hash value. If no row has a row filter that matches the subset of the hash value, then, the data manager system 110 knows that no row with this hash value has overflowed from this page, and the data manager system 110 avoids interrogating the hash overflow index 172.

In various embodiments, the page filter may be built differently. In certain embodiments, the page filter stores many n-bit entries, with each entry storing an entire hash value or a portion of a hash value for a row that has overflowed to another page.

In certain alternative embodiments, a variable number of bits represent the overflowed rows. For example, if the data manager system 110 reserves space for 8 one byte filters, the data manager system 110 can remember up to 8 different row filter values for rows overflowing. If the data manager system 110 needs to add a 9th row filter value to the page filter, it is possible to take the existing row filter values and reduce the number of bits that are stored. For example, if the data manager system 110 reduced the 8 bit row filter values to 6 bit row filter values, the data manager system 110 could now store ten 6 bit row filter values. Alternatively, the data manager system 110 could store 16-4 bit filters.

In yet other embodiments, the page filter is an array of 64 bits, where 6 bits of the hash value may be used to set a bit to indicate that rows with those 6 bits of the hash value being equal (i.e., the 6 bits of the target hash value equals the row filter value for that row) could have overflowed into the hash overflow index.

Thus, there are many ways to build the page filters. Regardless of how the page filters are built, storing the extra filter information to identify which rows could have overflowed allows the data manager system 110 to avoid interrogating the hash overflow index 172 a percentage of the time. This leads to savings in CPU usage and Input/Output (I/O) reductions.

In certain alternative embodiments, a collision chain filter is used instead of a page filter. The collision chain filter stores overflow filters as does the page filer, but, the collision chain filter is on the chain level.

The row filter is different from the page/chain filters. For example, the row filter is stored with a row and is used to reject a present row. The page filter is on a page/chain to indicate what values exist but are not on the chain. That is, the page/chain overflow filter is used to indicate whether a qualifying row could possibly be found in the overflow area 170. Moreover, in various embodiments, the row filter may be computed similarly to an overflow filter, but the row filter may be a different size, may use a different set of bits or be calculated differently.

Thus, in certain embodiments, the data manager system 110 allows for fast elimination of rows when scanning a collision chain in a hash space 160.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 9:
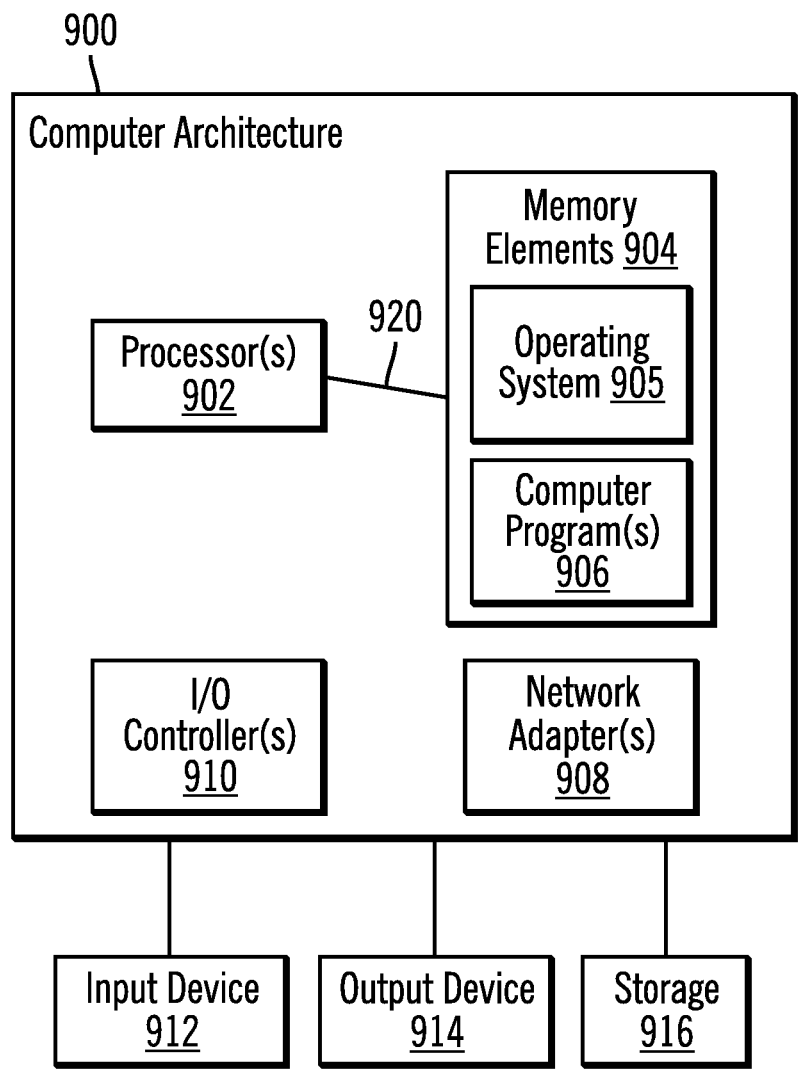
FIG. 9 illustrates, in a block diagram, a computer architecture that may be used in accordance with certain embodiments.

FIG. 9 illustrates a computer architecture 900 that may be used in accordance with certain embodiments. Computing device 100 may implement computer architecture 900. The computer architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The computer architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The computer architecture 900 may include fewer components than illustrated, additional components not illustrated herein, or some combination of the components illustrated and additional components. The computer architecture 900 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
    storing, using a processor of a computer, a page filter in a page, wherein the page filter is associated with a collision chain and includes a portion of a hash value of a row in the collision chain that has overflowed to an overflow area;
    dynamically adjusting the page filter to store different portions of the hash value for the overflowed row as a number of overflowed rows increases; and
    in response to a request to locate a target row, using the page filter to determine that the row has overflowed based on a portion of a hash value of the target row matching the portion of the hash value of the row that has overflowed.

2. The method of claim 1, wherein the page filter comprises entries, and
    wherein each of the entries stores an overflow filter.

3. The method of claim 2, wherein a size of the entries changes dynamically as more overflows occur.

4. The method of claim 1, wherein the page filter comprises an array of n-indicators, wherein each of the n-indicators comprises an overflow filter, and wherein each of the n-indicators is associated with a particular hash value.

5. The method of claim 1, wherein each of different collision chains has a different, associated page filter.

6. A computer program product, comprising:
    a non-transitory computer readable storage medium having computer readable program code embodied therewith, the computer readable program code comprising:
    computer readable program code, when executed by a processor of a computer, configured to perform:
    storing a page filter in a page, wherein the page filter is associated with a collision chain and includes a portion of a hash value of a row in the collision chain that has overflowed to an overflow area;
    dynamically adjusting the page filter to store different portions of the hash value for the overflowed row as a number of overflowed rows increases; and
    in response to a request to locate a target row, using the page filter to determine that the row has overflowed based on a portion of a hash value of the target row matching the portion of the hash value of the row that has overflowed.

7. The computer program product of claim 6, wherein the page filter comprises entries, and wherein each of the entries stores an overflow filter.

8. The computer program product of claim 7, wherein a size of the entries changes dynamically as more overflows occur.

9. The computer program product of claim 6, wherein the page filter comprises an array of n-indicators, wherein each of the n-indicators comprises an overflow filter, and wherein each of the n-indicators is associated with a particular hash value.

10. The computer program product of claim 6, wherein each of different collision chains has a different, associated page filter.

11. A computer system, comprising:
    a processor; and
    a storage device coupled to the processor, wherein the storage device has stored thereon a program, and wherein the processor is configured to execute instructions of the program to perform operations, wherein the operations comprise:
    storing a page filter in a page, wherein the page filter is associated with a collision chain and includes a portion of a hash value of a row in the collision chain that has overflowed to an overflow area;
    dynamically adjusting the page filter to store different portions of the hash value for the overflowed row as a number of overflowed rows increases; and
    in response to a request to locate a target row, using the page filter to determine that the row has overflowed based on a portion of a hash value of the target row matching the portion of the hash value of the row that has overflowed.

12. The computer system of claim 11, wherein the page filter comprises entries, and wherein each of the entries stores an overflow filter.

13. The computer system of claim 12, wherein a size of the entries changes dynamically as more overflows occur.

14. The computer system of claim 11, wherein the page filter comprises an array of n-indicators, wherein each of the n-indicators comprises an overflow filter, and wherein each of the n-indicators is associated with a particular hash value.

15. The computer system of claim 11, wherein each of 5 different collision chains has a different, associated page filter.

* * * * *